US011228371B2

(12) United States Patent
Morsy-Osman et al.

(10) Patent No.: US 11,228,371 B2
(45) Date of Patent: Jan. 18, 2022

(54) DSP-FREE 'COHERENT LITE' TRANSCEIVER FOR NEXT GENERATION 1 LAMBDA X 400G 10KM OPTICAL INTRA-DATACENTER INTERCONNECTS

(71) Applicants: Mohamed Morsy-Osman, Dorval (CA); Mohammed Sowailem, Gatineau (CA); Eslam El-Fiky, Dorval (CA); Thang Hoang, Nepean (CA); Stephane Lessard, Mirabel (CA); David V. Plant, Montreal (CA)

(72) Inventors: Mohamed Morsy-Osman, Dorval (CA); Mohammed Sowailem, Gatineau (CA); Eslam El-Fiky, Dorval (CA); Thang Hoang, Nepean (CA); Stephane Lessard, Mirabel (CA); David V. Plant, Montreal (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/642,643

(22) PCT Filed: Sep. 4, 2018

(86) PCT No.: PCT/IB2018/056754
§ 371 (c)(1),
(2) Date: Feb. 27, 2020

(87) PCT Pub. No.: WO2019/049030
PCT Pub. Date: Mar. 14, 2019

(65) Prior Publication Data
US 2021/0159983 A1 May 27, 2021

Related U.S. Application Data

(60) Provisional application No. 62/554,267, filed on Sep. 5, 2017.

(51) Int. Cl.
*H04B 10/00* (2013.01)
*H04B 10/25* (2013.01)
(Continued)

(52) U.S. Cl.
CPC ......... *H04B 10/2589* (2020.05); *H04B 10/40* (2013.01); *H04B 10/6151* (2013.01); *H04B 10/63* (2013.01); *H04J 14/06* (2013.01)

(58) Field of Classification Search
CPC .... H04B 10/2589; H04B 10/40; H04B 10/50; H04B 10/505; H04B 10/60; H04B 10/61; H04B 10/613; H04B 10/614
See application file for complete search history.

(56) References Cited

U.S. PATENT DOCUMENTS

2016/0134375 A1 5/2016 Kakande
2016/0261346 A1* 9/2016 Li ......................... H04B 10/40
(Continued)

FOREIGN PATENT DOCUMENTS

EP 0287378 A1 4/1988

OTHER PUBLICATIONS

2016 Ethernet Roadmap. Ethernet alliance.
(Continued)

*Primary Examiner* — Daniel G Dobson
(74) *Attorney, Agent, or Firm* — Ericsson Canada Inc.; Julie Dufort

(57) ABSTRACT

The disclosure relates to a transceiver operative to transmit and receive optical signals. The transceiver comprises a laser, a power splitter, a dual-polarization in-phase and quadrature modulator, DP-IQM, a first circulator (C1, C3), a second circulator (C2, C4), a first optical polarization controller, PC, a second optical polarization controller and a dual-polarization coherent receiver, DP-CRx. There is provided a system comprising a first transceiver and a second
(Continued)

transceiver as described previously. The transceiver requires neither high speed DSP nor high resolution data converters to achieve 50 Gbaud DP-16 QAM, DP standing for dual polarization and QAM standing for quadrature amplitude modulation, yielding 400 Gb/s over 10 km below the $2.2 \times 10^{-4}$ KP4 forward error correction (FEC) threshold.

8 Claims, 2 Drawing Sheets

(51) Int. Cl.
*H04B 10/40* (2013.01)
*H04B 10/61* (2013.01)
*H04B 10/63* (2013.01)
*H04J 14/06* (2006.01)
*H04J 14/00* (2006.01)

(56) References Cited

U.S. PATENT DOCUMENTS

2016/0301475 A1* 10/2016 Li ..................... H04B 10/503
2018/0083599 A1 3/2018 Kippenberg et al.

OTHER PUBLICATIONS

Aimone A et al.: "DAC-free Ultra-Low-Power Dual-Polarization 64-QAM Transmission with InP IQ Segmented MZM Module", 2016 Optical Society of America.
Chen, X et al.: "218-GB/s Single-Wavelength, Single-Polarization, Single-Photodiode Transmission Over 125-km of Standard Singlemode Fiber Using Kramers-Kronig Detection", 2017.
Cisco Corporation: "Cisco Global Cloud Index: Forecast and Methodology", 2014-2019, 2015 update.
Corning Corporation: "Corning SMF-28 Ultra Optical Fiber, product information", Nov. 2014.
Doerr, Christopher R. et al.: "Monolithic PDM-DQPSK receiver in silicon", ECOC 2010.
Konczykowska, A. et al.: "84 GBd (168 Gbit/s) PAM-4 3.7 Vpp power DAC in InP DHBT for short reach and long haul optical networks", Electronics Letters 1st. Oct. 2015, vol. 51, No. 20.
Madsen, C.K. et al.: "Multistage dispersion compensator using ring resonators", Nov. 15, 1999, vol. 24., No. 22.
Morsy-Osman, M. et al.: "1_224_Gb_s_10_km_Transmission_of_Polarization_Division_Multiplexed_PAM-4_Signals_using_1.3_m_SiP_Intensity_Modulator_and_a_Direct-Detection_MIMO-Based_Receiver", 2014.
SHF Communication Technologies AG, "Datasheet SHF 615 B 60 GBaud 3-Bit DAC", Feb. 23, 2017.

* cited by examiner

DSP-FREE 'COHERENT LITE' TRANSCEIVER FOR NEXT GENERATION 1 LAMBDA X 400G 10KM OPTICAL INTRA-DATACENTER INTERCONNECTS

PRIORITY STATEMENT UNDER 35 U.S.C. S.119(E) & 37 C.F.R. S.1.78

This non-provisional patent application claims priority based upon the prior U.S. provisional patent application entitled "A DSP-free 'Coherent Lite' Transceiver for next generation 1 lambda×400 G 10 km Optical Intra-Datacenter Interconnects", application No. 62/554,267, filed Sep. 5, 2017, in the names of MORSY-OSMAN et al.

TECHNICAL FIELD

The present disclosure relates to data transmission through optic fiber and more specifically to transceivers for the data transmission and reception.

BACKGROUND

Datacenter (DC) traffic, of which >75% stays within the same DC, is growing steadily. This is generating immense need for fast inexpensive power efficient intra-DC optics operating over 10 km. Ethernet speed is envisioned to reach 1.6 Tb/s after 2020 thus spectrally efficient high order modulation is essential to push the capacity per channel or carrier and multiplex fewer channels to achieve aggregate capacity. Various low-cost >10 km demonstrations at >200 Gb/s per channel or color were achieved. In parallel, coherent detection used in metro and long haul links enables high spectral efficiency by giving access to all four degrees of freedom on the optical carrier while providing superior sensitivity relative to direct detection. Some of the existing solutions are regarded as too expensive and power hungry for short reach optics.

SUMMARY

There is provided a transceiver operative to transmit and receive optical signals. The transceiver comprises a laser operative to generate a continuous wavelength. The transceiver comprises a power splitter operative to receive the continuous wavelength from the laser and to split the continuous wavelength into a first portion and a second portion. The transceiver comprises a dual-polarization in-phase and quadrature modulator, DP-IQM, operative to receive the first portion of the continuous wavelength from the power splitter and to modulate the first portion of the continuous wavelength according to a modulation format, thereby producing a first modulated signal. The transceiver comprises a first circulator (C1, C3) operative to receive the first modulated signal from the DP-IQM and to transmit the first modulated signal through a full-duplex fiber. The transceiver comprises a second circulator (C2, C4) operative to receive the second portion of the continuous wavelength, which is the first unmodulated signal, from the power splitter and to transmit the first unmodulated signal through the full-duplex fiber. The first circulator (C1, C3) is further operative to receive a second unmodulated signal from the full-duplex fiber and the second circulator (C2, C4) is further operative to receive a second modulated signal from the full-duplex fiber. The transceiver comprises a first optical polarization controller, PC, operative to receive the second unmodulated signal from the first circulator (C1, C3), and to adjust a polarization state of the second unmodulated signal, thereby producing a polarization state adjusted unmodulated signal. The transceiver comprises a second optical polarization controller operative to receive the second modulated signal from the second circulator (C2, C4) and to adjust the polarization state of the second modulated signal, thereby producing a polarization state adjusted modulated signal. The transceiver comprises a dual-polarization coherent receiver, DP-CRx, operative to receive, through a signal port, the polarization state adjusted modulated signal and, through a local oscillator port, the polarization state adjusted unmodulated signal, the DP-CRx performing coherent detection of modulating information and generating four electrical output signals.

The DP-CRx may comprise a 90° hybrid connected to four balanced photodiodes, the 90° hybrid receiving the polarization state adjusted modulated signal and the polarization state adjusted unmodulated signal through the signal port and the local oscillator port respectively, and the four balanced photodiodes operative to output the four electrical output signals.

The transceiver may further comprise an electrical signal generator generating four electrical input signals for use as input to the DP-IQM, the four electrical input signals providing information symbols and further signals for determining a type of modulation to be performed by DP-IQM to produce the first modulated signal.

The four electrical output signals may correspond to dual polarization in-phase quadrature signals.

The transceiver may further comprise a clock and data recovery, CDR, unit receiving the four electrical output signals, the CDR being operative to recover a clock and to perform decisions about which information symbols are received through the optical signal.

The first and second PC may be controlled by a low speed polarization tracking electrical circuit which feeds a sub-clock from the recovered clock at a rate $R_s/N$, where $R_s$ is the symbol rate and N is greater than 1000 at 50 Gbaud.

There is provided a system comprising a first transceiver and a second transceiver as described previously. The first transceiver is operative to transmit the first modulated signal, generated from a wavelength $\lambda_{12}$, through a first fiber of a fiber pair of the full-duplex fiber; transmit the first unmodulated signal, generated from the wavelength $\lambda_{12}$, through a second fiber of the fiber pair of the full-duplex fiber; receive the second unmodulated signal, generated from a wavelength $\lambda_{21}$, through the first fiber of the fiber pair of the full-duplex fiber; and receive the second modulated signal, generated from the wavelength $\lambda_{21}$, through the second fiber of the fiber pair of the full-duplex fiber. The second transceiver is operative to transmit the first unmodulated signal, generated from the wavelength $\lambda_{21}$, through the first fiber of the fiber pair of the full-duplex fiber; transmit the first modulated signal, generated from the wavelength $\lambda_{21}$, through the second fiber of the fiber pair of the full-duplex fiber; receive the second modulated signal, generated from the wavelength $\lambda_{12}$, through the first fiber of the fiber pair of the full-duplex fiber; and receive the second unmodulated signal, generated from the wavelength $\lambda_{12}$, through the second fiber of the fiber pair of the full-duplex fiber.

The transceivers provided herein present improvements to the way transceivers operate.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Certain aspects of the present disclosure and their embodiments may provide solutions to overcome the fact that existing solutions are too expensive and power hungry for short reach optics. There is proposed a power efficient optical intra-DC "coherent lite" transceiver that requires neither high speed DSP nor high resolution data converters. The proposed coherent lite transceiver was experimentally validated as achieving 50 Gbaud DP-16 QAM, DP standing for dual polarization and QAM standing for quadrature amplitude modulation, yielding 400 Gb/s over 10 km below the 2.2×10$^{-4}$ KP4 forward error correction (FEC) threshold. FEC stands for forward error correction, which is coding done to detect and correct random and burst errors within a received bit stream. KP4 is a term used to denote a certain FEC code called the Reed-Solomon RS(544,514) code because this code is standardized for use in 100 Gb/s backplane applications denoted 100 GBASE-KP4 within the Ethernet standard.

Figure 1:
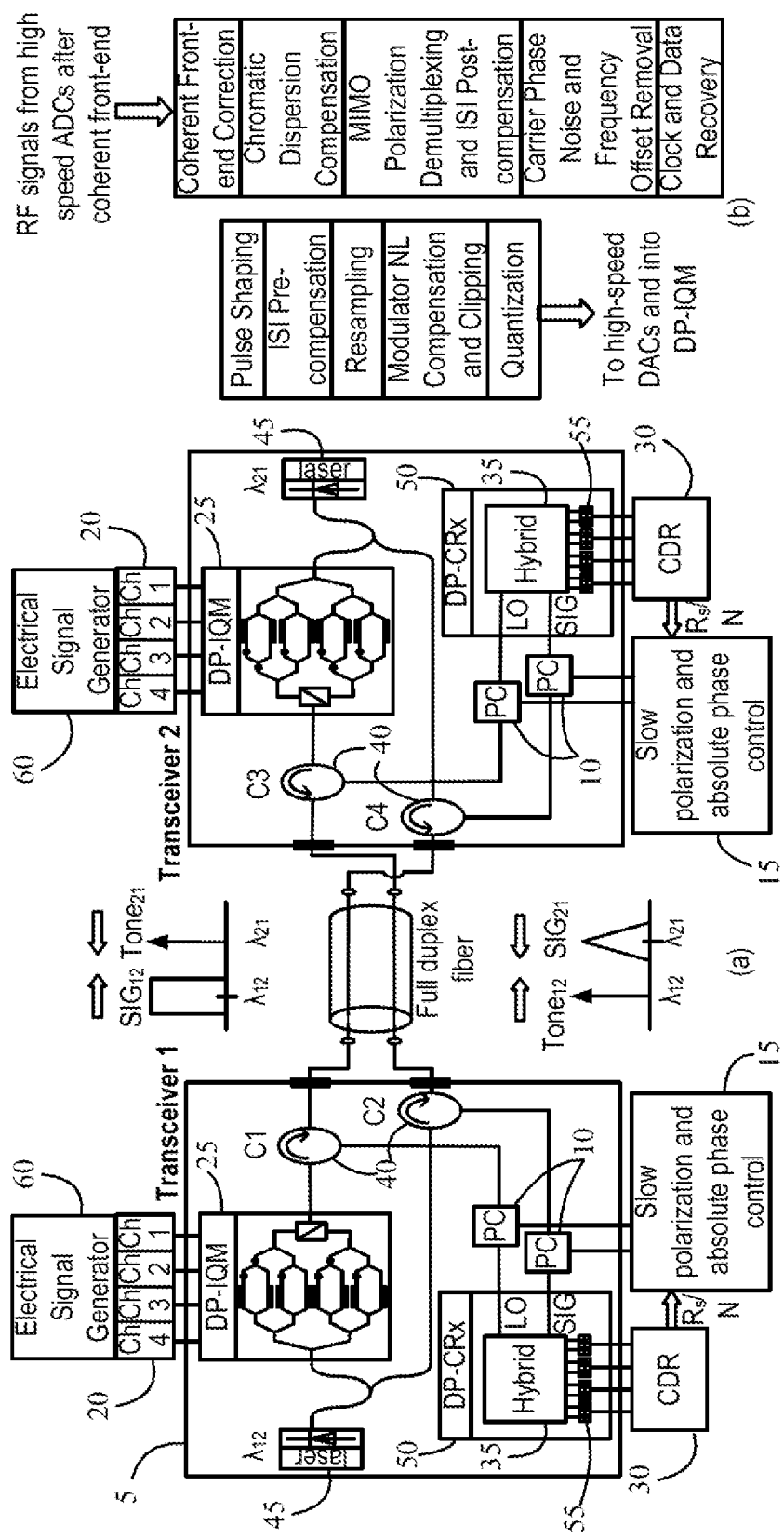
FIG. 1a is a schematic illustration of coherent-lite transceivers configured for full-duplex transmission using according to an example embodiment.
FIG. 1b is a schematic illustration of legacy coherent digital signal processor (DSP) that are omitted in the coherent-lite transceiver (left: transmitter DSP, right: receiver DSP excluding fiber nonlinearity migration).

Referring to FIG. 1a, the proposed coherent lite transceiver 5 is eliminating transmitter and receiver digital signal processor (DSP) conventionally required in a legacy coherent transceiver. Hence, power hungry, high-speed, high resolution digital-to-analog and analog-to-digital converters (DACs and ADCs) are no longer required along with application specific integrated circuits (ASIC) that perform DSP. In the proposed coherent lite system, conventional coherent DSP functions that are detailed in FIG. 1b are either discarded, possibly resulting in performance penalty, or replaced by an optical component. Henceforth, it is explained how the impairments corrected by DSP in FIG. 1b are dealt with in the proposed coherent lite system.

In FIG. 1a, low-speed electrical signals are represented by lines between PCs 10 and the box Slow polarization and absolute phase control 15. High-speed electrical signals are represented by the lines between boxes CH1 to CH4 20 and DP-IQM 25 and between CDR 30 and hybrid 35. Optical signals are represented by the lines between C1, C2 and C3, C4 40 and all other lines.

FIG. 1a shows the architecture of the proposed transceivers 5 at both ends of the link to realize full-duplex communication. Similar to conventional coherent transceiver, it includes a continuous wave (CW) laser 45, dual-polarization in-phase and quadrature modulator (DP-IQM) 25, and a dual polarization (DP) coherent receiver (DP-CRx) 50 realized from a 90° hybrid 35 and four balanced photodiodes 55. The DP-IQM 25 is driven by an electrical signal generator 60 providing four high-speed radio frequency (RF) signals depending on the modulation format employed. In principle, the electrical signal generator 60 does not need to employ expensive power hungry DACs with large bit resolution (e.g. 6 or 8) since no DSP is applied on the transmitted waveforms.

Producing four multilevel RF signal each with $\sqrt{M}$ levels is possible by active RF combining of $\log_2\sqrt{M}$ binary signals to generate high order DP M-QAM formats. Alternatively, M-QAM signals can be generated by a segmented DP-IQM with each segment driven by a binary RF signal realizing an optical DAC. Since the transmitter DSP, which is illustrated in FIG. 1b is omitted, all system components must have adequate RF bandwidth to avoid large penalties from uncompensated inter-symbol interference (ISI). Finally, in absence of Nyquist pulse shaping, there is no control on the pulse shape of RF signals which will generally be non-bandlimited.

At the receiver, some DSP blocks illustrated in FIG. 1b are omitted, namely front-end correction and inter-symbol interference (ISI) compensation. Penalty due to uncompensated ISI should be relatively small provided sufficient bandwidth. In addition, the absence of front end correction puts strict requirements on the front-end specifications (e.g. skew, power and phase imbalance). Finally, the remaining blocks in FIG. 1b are indispensable and cannot be ignored, namely chromatic dispersion (CD) compensation, polarization demultiplexing, carrier recovery and clock and data recovery (CDR).

CD can be avoided by operating the system in the O-band near the single mode fiber (SMF) zero dispersion wavelength. If C band operation is favoured, optical CD compensators can replace the omitted DSP. Although optical CD compensators amenable for photonic integration are available using all-pass structures (e.g. rings), their additional insertion loss is larger than the additional propagation loss (~1.5 dB) incurred after 10 km in the O-band relative to the C-band. Hence, the coherent lite system is best suited for O-band operation.

Next, removal of the carrier recovery DSP is accounted for by using a self-homodyne approach. The main idea is to make use of the full-duplex fiber that is readily deployed in intra-DC links (<10 km) to transmit the modulated signal and a copy of the transmit laser on the fiber pair of full-duplex fiber. This is achieved via the four circulators C1 to C4 40 and the two couplers depicted in FIG. 1a. For example, transceiver 1 uses a laser 45 at $\lambda_{12}$ that is first split; one part is modulated then passed by C1 and transmitted along the top fiber, while the other portion is passed unmodulated along the bottom fiber by C2. At transceiver 2, C3 and C4 pass the received signal and tone to the coherent front-end (bottom portion including components 10 and 50). Likewise, communication in opposite direction occurs at $\lambda_{21}$ and is allowed by the four circulators 40 and second couplers. Bidirectional transmission results in no penalty if $\lambda_{12}$ and $\lambda_{21}$ are sufficiently spaced to avoid nonlinear back scattering effects. If the signal and tone paths are almost matched, laser phase noise and frequency offset are negligible after beating in the coherent front-end and therefore DSP carrier recovery can be omitted.

Next, the polarization demultiplexing DSP is replaced by optical polarization controllers (PCs) 10 in both the tone and signal paths driven by low speed polarization tracking circuitry (<1 MHz). Because photonic integrated electrically controllable PCs have been realized by couplers and phase shifters, inserting them on chip before a coherent front-end achieves the necessary polarization demultiplexing.

Finally, CDR 30 accepts the outputs from balanced photodiodes 55, extracts the clock and performs data decisions. As shown in FIG. 1a, a sub-clock from the recovered clock at rate $R_s/N$, where $R_s$ is the symbol rate and N can be >1000 at 50 Gbaud, is fed back to the low speed polarization tracking circuitry 15 employing data-aided or decision-directed algorithms.

There is provided a transceiver operative to transmit and receive optical signals. The transceiver comprises a laser 45 operative to generate a continuous wavelength. The transceiver comprises a power splitter operative to receive the continuous wavelength from the laser 45 and to split the continuous wavelength into a first portion and a second portion. The transceiver comprises a dual-polarization in-phase and quadrature modulator, DP-IQM, 25 operative to receive the first portion of the continuous wavelength from the power splitter and to modulate the first portion of the continuous wavelength according to a modulation format, thereby producing a first modulated signal. The transceiver comprises a first circulator C1, C3 operative to receive the first modulated signal from the DP-IQM 25 and to transmit the first modulated signal through a full-duplex fiber. The transceiver comprises a second circulator C2, C4 operative to receive the second portion of the continuous wavelength, which is the first unmodulated signal, from the power splitter and to transmit the first unmodulated signal through the full-duplex fiber. The first circulator C1, C3 being further operative to receive a second unmodulated signal from the full-duplex fiber and the second circulator C2, C4 being further operative to receive a second modulated signal from the full-duplex fiber. The transceiver comprises a first optical polarization controller, PC, 10 operative to receive the second unmodulated signal from the first circulator C1, C3, and to adjust a polarization state of the second unmodulated signal, thereby producing a polarization state adjusted unmodulated signal. The transceiver comprises a second optical polarization controller 10 operative to receive the second modulated signal from the second circulator C2, C4 and to adjust the polarization state of the second modulated signal, thereby producing a polarization state adjusted modulated signal. The transceiver comprises a dual-polarization coherent receiver, DP-CRx, 50 operative to receive, through a signal port, the polarization state adjusted modulated signal and, through a local oscillator port, the polarization state adjusted unmodulated signal, the DP-CRx performing coherent detection of modulating information and generating four electrical output signals.

The DP-CRx 50 may comprise a 90° hybrid 35 connected to four balanced photodiodes 55, the 90° hybrid 35 receiving the polarization state adjusted modulated signal and the polarization state adjusted unmodulated signal through the signal port and the local oscillator port respectively, and the four balanced photodiodes 55 operative to output the four electrical output signals.

The transceiver may further comprise an electrical signal generator 60 generating four electrical input signals for use as input to the DP-IQM 25, the four electrical input signals providing information symbols and further signals for determining a type of modulation to be performed by DP-IQM 25 to produce the first modulated signal.

The four electrical output signals may correspond to dual polarization in-phase quadrature signals.

The transceiver may further comprise a clock and data recovery, CDR, 30 unit receiving the four electrical output signals, the CDR being operative to recover a clock and to perform decisions about which information symbols are received through the optical signal.

The first and second PC 10 may be controlled by a low speed polarization tracking electrical circuit 15 which feeds a sub-clock from the recovered clock at a rate $R_s/N$, where $R_s$ is the symbol rate and N is greater than 1000 at 50 Gbaud.

There is provided a system comprising a first and a second transceiver 5 as described previously. The first transceiver is operative to transmit the first modulated signal, generated from a wavelength $\lambda_{12}$, through a first fiber of a fiber pair of the full-duplex fiber; transmit the first unmodulated signal, generated from the wavelength $\lambda_{12}$, through a second fiber of the fiber pair of the full-duplex fiber; receive the second unmodulated signal, generated from a wavelength $\lambda_{21}$, through the first fiber of the fiber pair of the full-duplex fiber; and receive the second modulated signal, generated from the wavelength $\lambda_{21}$, through the second fiber of the fiber pair of the full-duplex fiber. The second transceiver is operative to transmit the first unmodulated signal, generated from the wavelength $\lambda_{21}$, through the first fiber of the fiber pair of the full-duplex fiber; transmit the first modulated signal, generated from the wavelength $\lambda_{21}$, through the second fiber of the fiber pair of the full-duplex fiber; receive the second modulated signal, generated from the wavelength $\lambda_{12}$, through the first fiber of the fiber pair of the full-duplex fiber; and receive the second unmodulated signal, generated from the wavelength $\lambda_{12}$, through the second fiber of the fiber pair of the full-duplex fiber.

Certain embodiments may provide one or more of the following technical advantage(s).
  a) The proposed coherent-lite transceiver provides access to all available four degrees of freedom on the optical field and hence yields high spectral efficiency similar to a conventional coherent transceiver. Spectral efficiency being the ratio of transmitted bit rate to bandwidth occupied for transmission.
  b) The proposed coherent-lite transceiver is DSP-free, i.e. there is no need to carry out any digital signal processing at the transmitter and receiver sides to mitigate the transmission impairments.

c) Since the proposed coherent-lite transceiver is DSP-free, high speed application specific integrated circuits (ASICs) that carry out the DSP are no longer needed.

d) Also since the proposed coherent-lite transceiver is DSP-free, high speed digital-to-analog converters (DACs) and analog-to-digital converters (ADCs) are also not required.

e) Removing the DSP-ASIC, DAC, ADC makes the proposed transceiver cheaper and also reduces the power consumption. Cost and power consumption are very important drivers for the short-reach intra-datacenter applications targeted by this transceiver.

Figure 2:
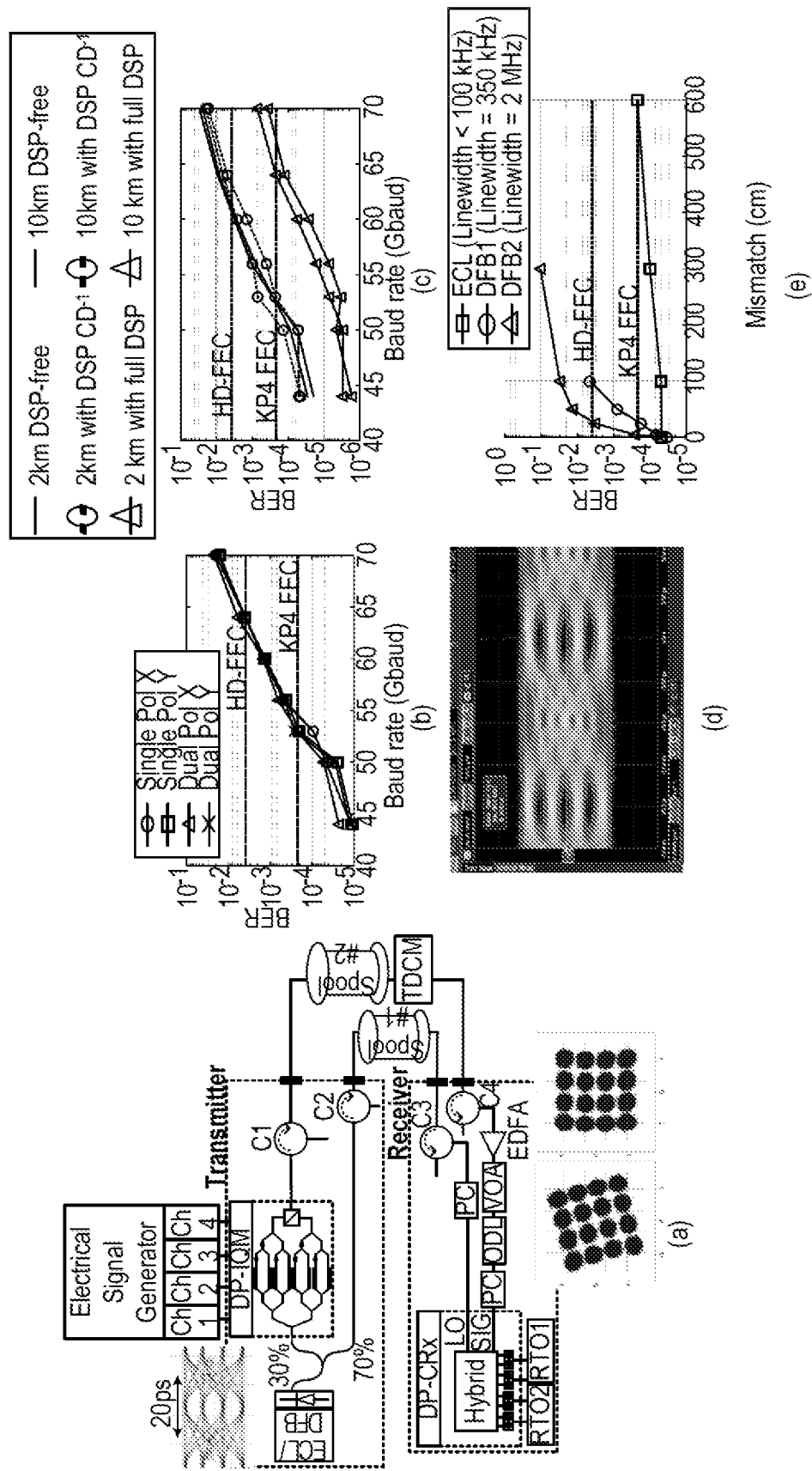
FIG. 2a is a schematic illustration of an experimental setup according to an example embodiment.
FIG. 2b is a graph of bit-error-rate (BER) versus baud rate for dual polarization (DP)-16 quadrature amplitude modulation (QAM) in back-to-back (B2B) for DP and single polarization (SP) transmission.
FIG. 2c is a graph of BER versus baud rate for DP-16 QAM after 2 and 10 km, comparing DSP-free, DSP chromatic dispersion (CD) compensation and full DSP performance.
FIG. 2d is a picture of Raw unequalized 50 Gbaud 4-level eyediagram of one received quadrature from a Keysight pulse-amplitude modulation (PAM)-4 analysis tool.
FIG. 2e is a graph of BER of 50 Gbaud 16 QAM in B2B versus mismatch between tone and signal paths for three different lasers.

FIG. 2a shows the experimental setup in which unidirectional transmission was demonstrated, i.e. one transmitter and one receiver of the full system in FIG. 1a were realized. Due to unavailability of certain O-band parts at the time of the experiment, the coherent lite system was verified in the C-band. CD was compensated by an optical tunable dispersion compensator module (TDCM) to demonstrate a DSP free system and was later compared in FIG. 2c to DSP based CD compensation. Also, instead of using a full duplex fiber, a pair of similar fiber spools was used with desired lengths (2 or 10 km). An optical delay line was inserted in the signal path to ensure matching with the tone path. A 15.5 dBm External Cavity Laser (ECL) with linewidth <100 kHz was used in all measurements except for the last part where two different Distributed Feedback Laser (DFB) lasers were also used to examine the linewidths tolerance in FIG. 2e.

The DP-IQM is a commercially available Indium phosphide (InP) modulator with 3 dB bandwidth of 35 GHz. The electrical signal generator comprised four 43 GHz RF amplifiers and generated 4-level RF signals yielding DP-16 QAM. The 50 Gbaud electrical eyediagrams is shown in the top left inset of FIG. 2a. At the receiver, four 40 GHz balanced PhotoDiodes (PDs) follow the DP hybrid. Due to unavailability of balanced PDs with transimpedance amplifiers (TIAs), an erbium-doped fiber amplifier (EDFA) was used in the signal path prior to the Coherent receiver (CRx), however the tone path was unamplified. Manual PCs were used in both signal and tone paths because the polarization state was stable enough in the lab environment. Two 63 GHz real-time scopes (RTOs) sampled the outputs of balanced photodiodes at 160 Giga samples per second (GSa/s) for offline error counting. Resampling and timing recovery were performed offline on the sampled waveforms before error counting.

In a real time coherent-lite receiver, timing recovery is performed by CDR circuit. In addition to timing recovery, a common phase rotation angle had to be estimated from the sampled waveforms and the I and Q waveforms per polarization had to be derotated with this angle. It was hypothesized that this slowly varying rotation was due to any small path length mismatch between the signal and tone paths which may vary slowly with time due to any ambient temperature and pressure changes around the two fibers spools. However, this common phase is constant during the entire captured waveform that lasts ~12.5 µs. The entire 50 Gbaud 16 QAM waveform is depicted by the constellations in the insets of FIG. 2a before and after common phase derotation. Other than that, no DSP is applied at the receiver to obtain these constellations after 2 km. The real-time raw unequalized 4-level eyediagram of one quadrature obtained on the RTO by the Keysight PAM4 analysis tool is also shown in FIG. 2d. In a real time coherent-lite receiver, the slowly varying phase derotation can be achieved by the electrically controlled PCs depicted in FIG. 1a (provided they have three stages of variable phase shifters).

FIG. 2b shows the bit error rate (BER) versus baud rate in back-to-back for 16 QAM in two scenarios: single and dual polarization (SP and DP) transmission where the BER is counted per polarization. This figure shows no penalty arising from DP transmission compared to SP, i.e. polarization demultiplexing is properly achieved optically. For later results, average BER of the two polarizations is reported for DP case. Next, FIG. 2c compares the DSP-free performance obtained with the TDCM at 2 and 10 km with two cases in which TDCM was removed: i) only CD is compensated digitally, ii) the full DSP stack of FIG. 1b is applied including ISI compensation. No significant difference between compensating CD optically or digitally is noticed. Also, results confirm DSP-free 400 Gb/s 10 km transmission below the KP4 FEC threshold. Further, compensating residual ISI by leveraging the full DSP stack improves the BER by an order of magnitude and pushes capacity below KP4 FEC to 512 Gb/s (64 Gbaud).

Finally, FIG. 2e shows the effect of mismatch between tone and signal paths on the BER of 50 Gbaud 16 QAM in B2B. Three 15.5 dBm lasers with different linewidths were compared. With the ECL, the system tolerates huge mismatches up to 6 m. With 350 kHz DFB laser, the system still tolerates 25 cm of mismatch without DSP carrier recovery.

In conclusion, a DSP-free coherent lite transceiver that circumvents high-speed, high-resolution DACs and ADCs for 10 km intra-DC optics is proposed. The proposed transceiver architecture can be fully integrated on chip and can exploit low cost DFB lasers. By replicating the 400 Gb/s single color experimental demonstration on four multiplexed wavelengths, 1.6 Tb/s aggregate capacity can be realized below KP4 FEC after 10 km.

The invention claimed is:

1. A transceiver operative to transmit and receive optical signals, comprising:

a laser (45) operative to generate a continuous wavelength;

a power splitter operative to receive the continuous wavelength from the laser (45) and to split the continuous wavelength into a first portion and a second portion;

a dual-polarization in-phase and quadrature modulator, DP-IQM, (25) operative to receive the first portion of the continuous wavelength from the power splitter and to modulate the first portion of the continuous wavelength according to a modulation format, thereby producing a first modulated signal;

a first circulator (C1, C3) operative to receive the first modulated signal from the DP-IQM (25) and to transmit the first modulated signal through a full-duplex fiber;

a second circulator (C2, C4) operative to receive the second portion of the continuous wavelength, which is the first unmodulated signal, from the power splitter and to transmit the first unmodulated signal through the full-duplex fiber;

the first circulator (C1, C3) being further operative to receive a second unmodulated signal from the full-duplex fiber and the second circulator (C2, C4) being further operative to receive a second modulated signal from the full-duplex fiber;

a first optical polarization controller, PC, (10) operative to receive the second unmodulated signal from the first circulator (C1, C3), and to adjust a polarization state of the second unmodulated signal, thereby producing a polarization state adjusted unmodulated signal;

a second optical polarization controller (10) operative to receive the second modulated signal from the second circulator (C2, C4) and to adjust the polarization state of the second modulated signal, thereby producing a polarization state adjusted modulated signal; and a dual-polarization coherent receiver, DP-CRx, (50) operative to receive, through a signal port, the polarization state adjusted modulated signal and, through a local oscillator port, the polarization state adjusted unmodulated signal, the DP-CRx performing coherent detection of modulating information and generating four electrical output signals.

2. The transceiver of claim 1, wherein the DP-CRx (50) comprises a 90° hybrid (35) connected to four balanced photodiodes (55), the 90° hybrid (35) receiving the polarization state adjusted modulated signal and the polarization state adjusted unmodulated signal through the signal port and the local oscillator port respectively, and the four balanced photodiodes (55) operative to output the four electrical output signals.

3. The transceiver of claim 1, further comprising an electrical signal generator (60) generating four electrical input signals for use as input to the DP-IQM (25), the four electrical input signals providing information symbols and further signals for determining a type of modulation to be performed by DP-IQM (25) to produce the first modulated signal.

4. The transceiver of claim 1, wherein the four electrical output signals correspond to dual polarization in-phase quadrature signals.

5. The transceiver of claim 1, further comprising a clock and data recovery, CDR, (30) unit receiving the four electrical output signals, the CDR being operative to recover a clock and to perform decisions about which information symbols are received through the optical signal.

6. The transceiver of claim 5, wherein the first and second PC (10) are controlled by a low speed polarization tracking electrical circuit (15) which feeds a sub-clock from the recovered clock at a rate $R_s/N$, where $R_s$ is the symbol rate and N is greater than 1000 at 50 Gbaud.

7. A system comprising:
a first transceiver operative to:
transmit a first modulated signal, generated from a wavelength $\lambda_{12}$, through a first fiber of a fiber pair of a full-duplex fiber;
transmit a first unmodulated signal, generated from the wavelength $\lambda_{12}$, through a second fiber of the fiber pair of the full-duplex fiber;
receive a second unmodulated signal, generated from a wavelength $\lambda_{21}$, through the first fiber of the fiber pair of the full-duplex fiber; and
receive a second modulated signal, generated from the wavelength $\lambda_{21}$, through the second fiber of the fiber pair of the full-duplex fiber; and
a second transceiver operative to:
transmit the first unmodulated signal, generated from the wavelength $\lambda_{21}$, through the first fiber of the fiber pair of the full-duplex fiber;
transmit the first modulated signal, generated from the wavelength $\lambda_{21}$, through the second fiber of the fiber pair of the full-duplex fiber;
receive the second modulated signal, generated from the wavelength $\lambda_{12}$, through the first fiber of the fiber pair of the full-duplex fiber; and
receive the second unmodulated signal, generated from the wavelength $\lambda_{12}$, through the second fiber of the fiber pair of the full-duplex fiber.

8. The system of claim 7, wherein the first and second transceivers comprise:
a laser (45) operative to generate a continuous wavelength;
a power splitter operative to receive the continuous wavelength from the laser (45) and to split the continuous wavelength into a first portion and a second portion;
a dual-polarization in-phase and quadrature modulator, DP-IQM, (25) operative to receive the first portion of the continuous wavelength from the power splitter and to modulate the first portion of the continuous wavelength according to a modulation format, thereby producing a first modulated signal;
a first circulator (C1, C3) operative to receive the first modulated signal from the DP-IQM (25) and to transmit the first modulated signal through a full-duplex fiber;
a second circulator (C2, C4) operative to receive the second portion of the continuous wavelength, which is the first unmodulated signal, from the power splitter and to transmit the first unmodulated signal through the full-duplex fiber;
the first circulator (C1, C3) being further operative to receive a second unmodulated signal from the full-duplex fiber and the second circulator (C2, C4) being further operative to receive a second modulated signal from the full-duplex fiber;
a first optical polarization controller, PC, (10) operative to receive the second unmodulated signal from the first circulator (C1, C3), and to adjust a polarization state of the second unmodulated signal, thereby producing a polarization state adjusted unmodulated signal;
a second optical polarization controller (10) operative to receive the second modulated signal from the second circulator (C2, C4) and to adjust the polarization state of the second modulated signal, thereby producing a polarization state adjusted modulated signal; and
a dual-polarization coherent receiver, DP-CRx, (50) operative to receive, through a signal port, the polarization state adjusted modulated signal and, through a local oscillator port, the polarization state adjusted unmodulated signal, the DP-CRx performing coherent detection of modulating information and generating four electrical output signals.

\* \* \* \* \*